July 28, 1970  J. M. SHEESLEY ET AL  3,521,892

SEAL

Filed Jan. 3, 1968  2 Sheets-Sheet 1

Ronald A. Gulick
John M. Sheesley
INVENTORS

BY

ATTORNEY

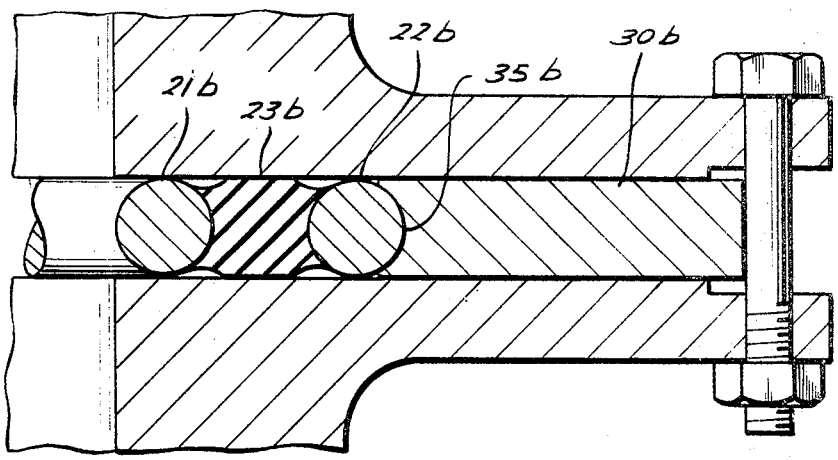
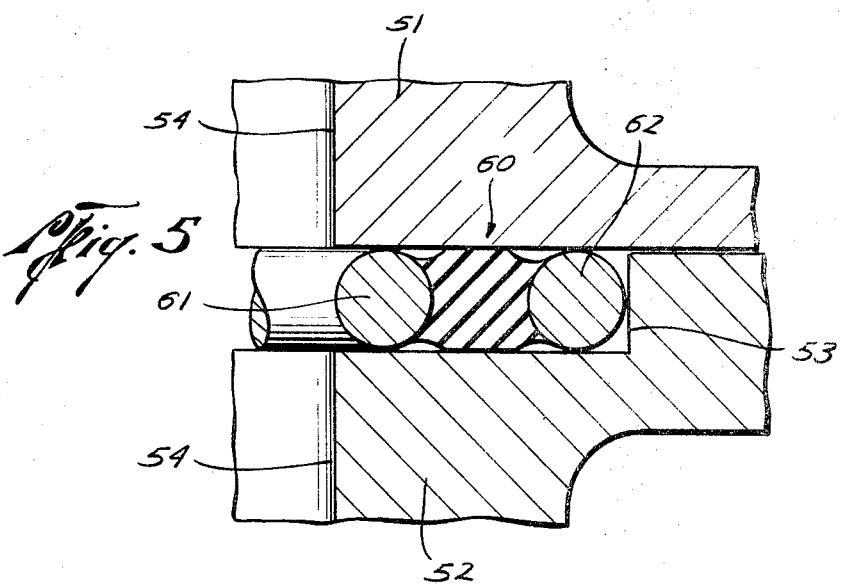
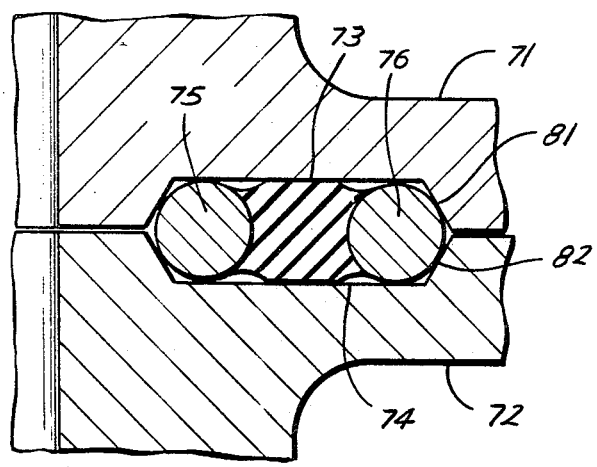
Ronald A. Gulick
John M. Sheesley
INVENTORS
ATTORNEY

United States Patent Office 3,521,892
Patented July 28, 1970

3,521,892
SEAL
John M. Sheesley, Houston, and Ronald A. Gulick, Sugarland, Tex., assignors to Research Engineering Company, Houston, Tex., a corporation of Texas
Continuation-in-part of application Ser. No. 685,888, Nov. 27, 1967. This application Jan. 3, 1968, Ser. No. 695,421
Int. Cl. B65a 53/00; F16j 15/00; F16k 41/00
U.S. Cl. 277—171                    2 Claims

ABSTRACT OF THE DISCLOSURE

Seal having concentric rings interconnected by deformable sealing element having an undulating configuration. Further, annular ring may be positioned intermediate the radially outermost of said concentric rings and the bolts or fasteners used to join mated flanges. Flanges may be grooved or recessed to receive the seal.

BACKGROUND OF THE INVENTION

Field of the invention

This application is a continuation-in-part of applicants' prior copending application entitled Seal, filed Nov. 27, 1967, under Ser. No. 685,888.

Many industrial applications require that flanged elements be joined together. For example, section after section of flanged pipe are necessarily linked to form a conduit of any length. When the adjacent surfaces of the flanges of adjacent links are joined, as by bolts passing therethrough, seals are normally provided intermediate such adjacent surfaces to prevent leakage into and/or from the conduit portion of the pipe. Sometimes these seals, such as O rings, are placed within grooves provided such surfaces. This invention is concerned with such seals. Examples of the prior art may be found in U.S. Pat. Nos. 2,269,486; 2,914,350; 3,033,582; 3,074,427; 3,153,541; 3,158,380; 3,231,289; 3,279,805; 685,610; 1,834,581; 2,291,709; 2,307,440; and 2,513,178.

Description of the prior art

Annular sealing means have been described in the prior art which concentrically surround the pipe opening, see U.S. Pat. No. 2,717,793. Such seals normally include a deformable portion which may be clamped between the adjacent flange faces. The material may flow within a positioning element, which may be an annular ring having a groove which contains the deformable portion. Such an arrangement contemplates the positioning element being fixed in size. This, then, requires stocking a large number of sizes, even for use on pipe having the same internal diameter, inasmuch as the diameter of the outside bolt circle may vary.

SUMMARY OF THE INVENTION

This invention contemplates a sealing element of fixed internal diameter. This element includes a deformable central portion joined to a pair of concentric sealing rings. According to one embodiment this sealing element may be positioned within a groove or recess provided in one or both of the joined surfaces. In another embodiment, an outer spacer ring member may be affixed, by welding or by less permanent means such as snap-fitting, to the outermost sealing ring portions of the sealing element. Although the sealing element and spacer ring may not be joined, merely abut, it is preferable that they be linked, albeit removably. The radially internal surface of the spacer ring may be conformed so as to correlate with the external configuration of the outermost sealing ring or simply so configured in a non-correlative manner but so as to permit said sealing ring to be snapped into engagement therewith. This means that a sealing element of a fixed diameter may be used with all pipe having the same appropriate internal diameter. For conduits having flanges of differing diameters, outer spacer rings or members, where appropriate, may be available in differing sizes. Thus, the quantity of material that need be stock may be substantially reduced, resulting in more economical operations.

DESCRIPTION OF THE DRAWINGS

FIG. 4 is an axial section similar to FIG. 2, with a modified form of spacer ring;

FIG. 5 is a further broken axial section depicting the sealing element utilized with a single grooved flange; and FIG. 6 is also a broken axial section showing the sealing element as positioned within the annulus formed by adjacent flange grooves.

DESCRIPTION OF THE INVENTION

Figure 1:
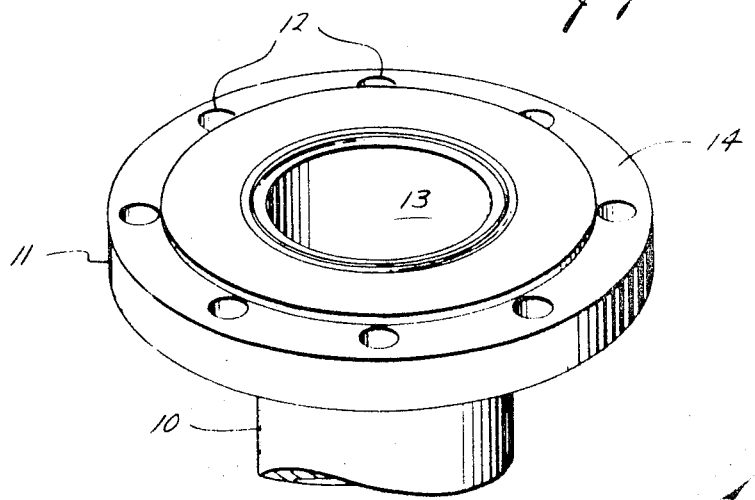
FIG. 1 is a broken perspective of one flanged end of a pipe section, with one embodiment of the seal of this invention in place thereon.

Looking first at FIG. 1, one end of a generalized section of pipe 10 is seen to have a flange 11 affixed thereto or integral therewith. Bolt holes 12 are annularly spaced and pass through flange 11, allowing the fastening of an adjacent section of flanged conduit. One purpose of this invention, and similar devices, is to prevent material passing through a conduit from leaking out at junctures, or from outside matter there contaminating such material. Numeral 13 identifies the conduit passing through pipe 10. The seal would rest adjacent surface 14 of flange 11, and intermediate such surface and a similar one on the linked pipe flange not shown in FIG. 1.

The sealing device of one form of this invention includes two general components, a sealing element 20 and a spacer ring 30. Sealing element 20 is annular in configuration, is positioned at or closely adjacent, and concentric with conduit 13 of the pipe sections to be joined and sealed. This element 20 includes spaced annular sealing or retainer rings, 21 being the radially innermost and 22 the outermost. These retainer rings are connected by annular deformable elastomeric seal 23, rubber or many plastics forming suitable material therefor. The outer surface of seal 23 is undulating, with crown portion 24 extending somewhat beyond the extent of retainer rings 21, 22. Valleys 25 are intermediate the crown of seal 23 and the retainer rings. These valleys may receive material that flows from the crown, when seal 23 is compressed between adjacent pipe flanges.

Concentric with sealing element 20, and radially outward thereof, is annular spacer ring 30. This member is substantially an annular plate having a thickness "X" smaller by an incremental amount than the thickness or diameter of retainer rings 21, 22. This spacer ring 30 would have a width "W" extending from or closely adjacent the outermost retainer ring 22 to the bolt circles formed by bolts passing through the holes 12 in the adjacent pipe flanges. These spacer rings may be joined, as by welding, to the outermost retainer ring, this joinder is not depicted in the drawings, although non-integral operation of such parts is within the contemplation of this invention.

Figure 2:
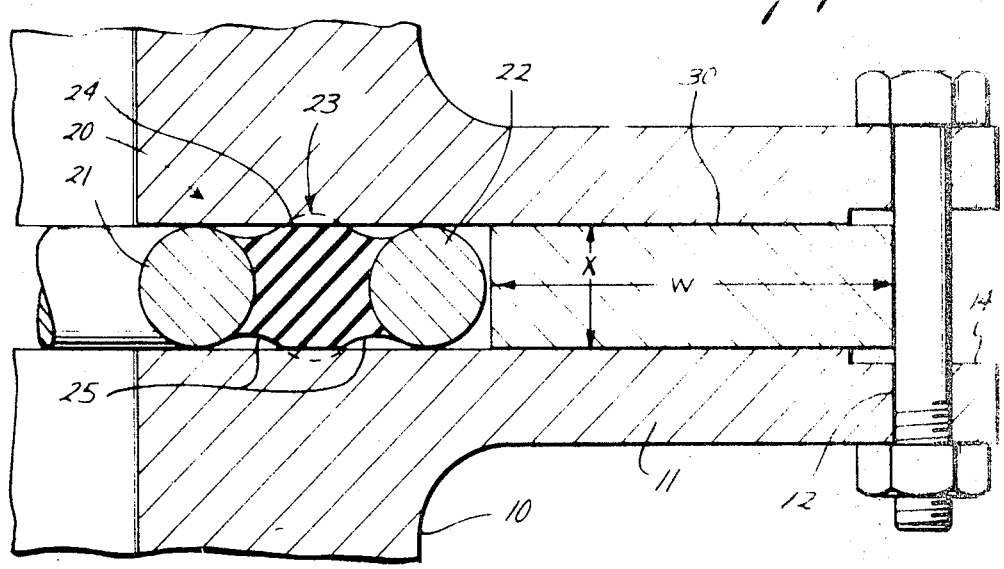
FIG. 2 is an axial section through the sealing element and adjacent spacer ring of FIG. 1.
Figure 3:
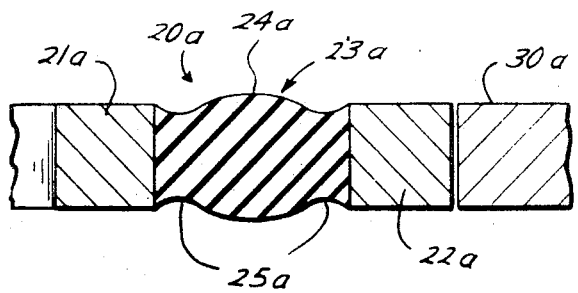
FIG. 3 is an axial section through a modified version of the sealing element and a spacer ring.

The modification of FIG. 3 demonstrates that the retainer rings may have differing configurations. Subscripts have been added in FIG. 3 to the basic numerals applied in FIG. 2.

Further subscripts have been utilized in FIG. 4, to illustrate an embodiment of the spacer ring. Here retainer rings 21$_b$ and 22$_b$ are joined by seal 23$_b$. Surrounding outer retainer ring 22$_b$ is spacer ring 30$_b$, similar in operation to that of FIG. 2. It should be noted that radially innermost side 35$_b$ of spacer ring 30$_b$ is concave to accommodate ring 22. This permits the sealing element to be snapped into the spacing ring. The actual shape may vary, the point being that the two elements may have correlative configurations of their adjacent surfaces or the spacer ring surface should be so configured as to accommodate or receive and position the adjacent retainer ring.

The parts of FIGS. 1 through 4 having been fully described, the assembly and/or operation of the invention depicted therein will be briefly spelled out. The sealing element 20 of the proper dimension may be chosen solely as a function of the bore diameter of the linked pipe sections. This element would be concentric with and outwardly of the bore of the conduit portion of such sections. Inasmuch as the diameters of the outside bolt circle may differ, some allowance must be made in terms of material stocked. Prior seals have made the sealing element and spacer ring into a single unit. Thus different size seals were required for different diameter bores as well as for pipe having the same bore diameter but varying bolt circle diameters. Here, once the sealing element is chosen, based only on the bore diameter, the proper spacer ring may be chosen to position the sealing element 20 relative to the bolt circle. While the same number of spacer ring sizes may need to be stocked, the absolute quantity of sealing elements necessary is reduced. In any case, the proper sealing element 20 or 20$_a$ or 20$_b$ is first selected. It may be joined, as by welding (not shown) to the properly sized spacer ring, may simply rest adjacent thereto, or may be snapped into same as may be the case with the spacer ring 30$_b$ of FIG. 4. The assembly would then be positioned adjacent surface 14 of one pipe flange. On the other flange being bolted to the first, the outer circumference of the spacer ring 20 would rest at or inside the circle of bolts passing through holes 12. Crown 24 of seal 23 would be compressed between adjacent flange faces, so as to flow into valleys 25, the pressure between the seal and the flange surfaces effecting a seal. Further, metal to metal compression seals would occur between the flange faces and the retainer rings 21, 22. This effectively bars leakage of the elastomeric seal 30. This seal is enhanced by the spacer ring being made a bit thinner than the retainer rings. This permits the retainer rings to act as seals as well as functioning as non-extrusion rings for the elastomeric or plastic sealant material. The arrangement of metal to metal seals just inside and outside of the elastomeric seal permits use under higher pressures, in that a seal may continue even on partial deterioration of the rubber (or similar material) portion 24.

This metal to metal seal occurring inside and outside of a deformable seal is illustrated by the sealing element used alone in FIGS. 5 and 6. In FIG. 5, pipe sections 51 and 52 may be joined by bolts not shown. One of these flanges or combination of flange and bulkhead fittings may be annularly recessed at 53 near or adjacent to bore 54, which communicates with a like bore in section 51. Within this recess a sealing element 60 is placed. This sealing element may be comprised of the same constituents as members 20 or 20$_a$ of FIGS. 2 or 3. On pressing the flange faces of the two pipe sections together, the central elastomeric portion deforms and makes a seal. Also, the flanges, along with sealing rings 61, 62 form a metal to metal seal. This metal to metal seal is enhanced in FIG. 6 by forming annular cuts or recesses 73, 74 within the flanges of pipe section 71, 72. On these flanges being pressed together, not only is the elastomeric pressure acting seal provided as well as the metal to metal seals between the pipe flanges and sealing rings 75, 76 but also this metal to metal seal becomes a pressure acting seal. As the pressure increases the sealing ring, such as 76 deforms radially outward to produce a bearing stress between it and recess portions 81, 82 sufficiently high to effect the seal. On initial makeup these surfaces 81, 82 are slightly smaller in diameter than the meeting outer surface of ring 76, thus an initial contact is made when the flanges are assembled. Such sealing effects permit operation at extremely high pressures. The beveled sides of the upper flange grooves such as 81 are, prior to tightening the bolts, resting on the outer diameter of rings 75, 76. On clamping the flanges together the desired wedging effect is accomplished to achieve the metal seal, which seals the elastomer allowing it, 73, to perform the low pressure sealing requirements and later on, as pressure rises, allows ring 76 to meet the high pressure sealing requirements.

Although limited embodiments have been described, it should be obvious that numerous embodiments would be possible by one skilled in the art without departing from the spirit of the invention, the scope of which is limited only by the following claims:

What is claimed is:

1. In a sealing device wherein mating flanges have oppositely disposed and communicating grooves, and sealing means are positioned within said grooves, an improved seal comprising:

first and second annular ring members, each having substantially circular cross section, said first ring member being radially interior of said second ring member;

annular elastomeric seal member of deformable material joined to each of said ring members and connecting them, said elastomeric seal member having oppositely disposed peak portions thicker than either of said ring members' diameter, and further including valleys intermediate said peak portions and the junctures of said elastomeric seal member with said ring members, said valleys each having a portion of a thickness less than said ring members' diameter;

said sealing means being positioned within said flange grooves wherein prior to said flanges being forced together, the diameter of said rings is greater than the combined depths of said grooves, and said grooves are so configured that prior to tightening, said flanges are not in contact and each of said ring members contacts each of said flange grooves at at least two points, whereby on tightening occurring, metal-to-metal pressure acting sealing occurs.

2. A flange seal comprising:

first and second secondary seals, each of said secondary seals being metallic and of toroidal configuration, said first secondary seal being concentric with said second secondary seal and radially interior thereof;

primary seal means, of deformable but substantially noncompressible material, fixedly connected at its opposite ends to each of said secondary seals, said primary seal means being annular as well as concentric with each of and intermediate said secondary seals, said primary seal means further including peak portions of a thickness greater than the diameter of either of said secondary seals and further including valley portions, on opposite sides of said peak portions and intermediate said peak portions and each of said secondary seals, of a thickness less than the diameter of either of said secondary seals, whereby on said primary seal being subjected to pressure from coacting flanges, material from said peak portions may flow into said valley portions; and combination annular spacer ring and sealing means concentric with said first and second secondary seals and radially exterior of the outermost of said secondary seals, said combination means presenting substantially flat upper and lower surfaces for sealing engagement with such flanges, said combination means being of such width and thickness as to provide, in conjunction with mating flanges, an additional seal exterior of said secondary seal.

References Cited

UNITED STATES PATENTS

| | | | |
|---|---|---|---|
| 2,442,312 | 5/1948 | Price | 277—11 |
| 2,422,009 | 6/1947 | Goetze | 277—171 X |
| 2,722,043 | 11/1955 | Nenzell | 277—180 X |
| 3,033,582 | 5/1962 | Creavey | 277—180 |
| 3,078,110 | 2/1963 | Starr. | |
| 3,153,541 | 10/1964 | Rudder | 277—180 |
| 3,167,322 | 1/1965 | Aichroth | 277—180 |
| 3,195,906 | 7/1965 | Moyers | 277—180 |
| 3,248,119 | 4/1966 | Smith et al. | 277—180 X |
| 3,279,805 | 10/1966 | Quinson | 277—162 |
| 368,189 | 8/1887 | Carter | 277—198 |

FOREIGN PATENTS

| | | |
|---|---|---|
| 701,614 | 12/1953 | Geat Britain. |
| 836,669 | 6/1960 | Great Britain. |
| 937,707 | 9/1963 | Great Britain. |

SAMUEL ROTHBERG, Primary Examiner

U.S. Cl. X.R.

277—180; 285—336